US005761327A

United States Patent [19]

Papritz

[11] Patent Number: 5,761,327

[45] Date of Patent: Jun. 2, 1998

[54] GROUP OF MEASURED FIELDS FOR DETERMINING COLOR DATA OF A PRINTED PRODUCT

[75] Inventor: Stephan Papritz, Rubingen, Switzerland

[73] Assignee: Maschinenfabrik Wifag, Bern, Switzerland

[21] Appl. No.: 380,360

[22] Filed: Jan. 30, 1995

[30] Foreign Application Priority Data

Jan. 31, 1994 [DE] Germany .......................... 44 02 828.8

[51] Int. Cl.[6] .............................. G06K 9/00; H04N 1/46; B41F 33/00

[52] U.S. Cl. .......................... 382/112; 382/167; 358/517; 358/504; 101/211; 101/484

[58] Field of Search .................................... 382/112, 167; 358/518, 519, 520, 523, 517, 504; 364/526; 101/211, 484

[56] References Cited

U.S. PATENT DOCUMENTS

| | | | |
|---|---|---|---|
| 4,852,485 | 8/1989 | Brunner | 101/211 |
| 4,967,379 | 10/1990 | Ott | 364/526 |
| 4,975,862 | 12/1990 | Keller et al. | 364/526 |
| 5,068,810 | 11/1991 | Ott | 364/526 |
| 5,206,707 | 4/1993 | Ott | 356/402 |
| 5,317,425 | 5/1994 | Spence et al. | 358/504 |
| 5,333,069 | 7/1994 | Spence | 358/518 |
| 5,602,970 | 2/1997 | Janser | 395/109 |

FOREIGN PATENT DOCUMENTS

| | | | |
|---|---|---|---|
| 0196431B1 | 2/1986 | European Pat. Off. | B41F 33/00 |
| 0321402A1 | 6/1989 | European Pat. Off. | B41F 33/00 |
| 0408507A1 | 1/1991 | European Pat. Off. | B41F 33/00 |
| 4209165A1 | 9/1992 | Germany | B41F 33/00 |

*Primary Examiner*—Leo Boudreau
*Assistant Examiner*—Wenpeng Chen
*Attorney, Agent, or Firm*—McGlew and Tuttle

[57] ABSTRACT

A group of measured fields (as well as a process for using the measured fields) is provided for determining color data of a printed product, especially for color management in the rotary offset printing of single editions, with a plurality of measured fields, which are printed on a printed product to be checked or on a primary print in such a way that they can be optically scanned. The group of measured fields includes a first combination measured field, in which the fundamental colors are superprinted with their nominal degrees of surface coverage ($F_{c1}$, $F_{m1}$, $F_{y1}$). Additional combination measured fields are provided, in which the fundamental colors are superprinted at varied nominal degrees of surface coverage $\{(F_{c2}=F_{c1}+\Delta F_{c2}, F_{m1}, F_{y1}), (F_{c1}, F_{m3}=F_{m1}+\Delta F_{m3}, F_{y1}), (F_{c1}, F_{m1}, F_{y4}=F_{y1}+\Delta F_{y4})\}$, wherein each fundamental color is varied at least once, and at least one other fundamental color is varied in each additional combination measured field. Additionally at least one single-color full-tone field is provided for each fundamental color. Further, at least one single-color half-tone field is provided for each fundamental color, wherein first single-color half-tone fields have, in their corresponding fundamental color, a degree of surface coverage ($F_{c1}$, $F_{m1}$, $F_{y1}$) that corresponds to that of the same color in the first combination measured field, and/or second single-color half-tone fields have, in their corresponding fundamental color, a degree of surface coverage ($F_{c2}$, $F_{m3}$, $F_{y4}$) that corresponds to the varied degree of surface coverage of the same color in the additional combination measured fields.

16 Claims, 4 Drawing Sheets

Fig. 2a

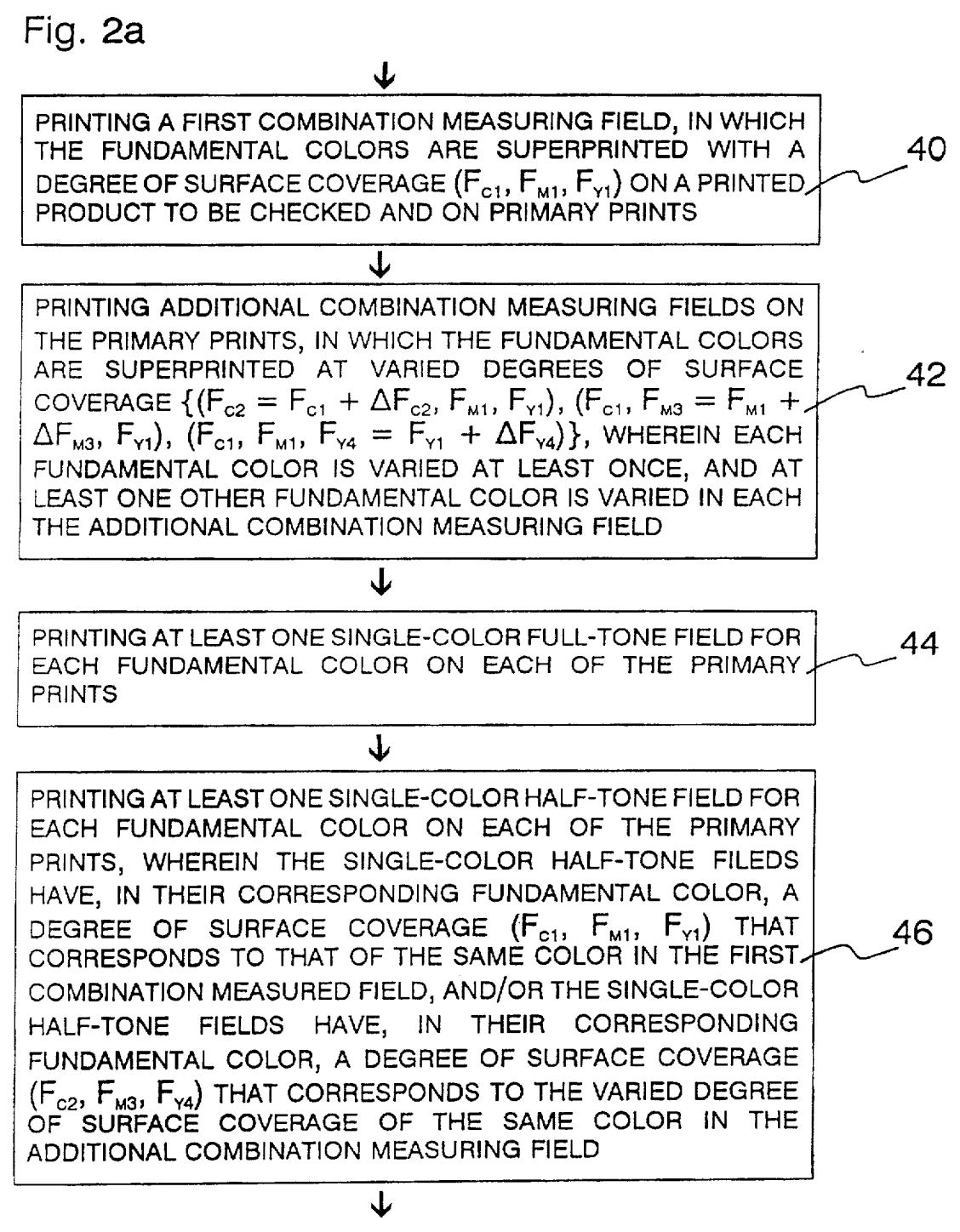

↓

PRINTING A FIRST COMBINATION MEASURING FIELD, IN WHICH THE FUNDAMENTAL COLORS ARE SUPERPRINTED WITH A DEGREE OF SURFACE COVERAGE ($F_{C1}$, $F_{M1}$, $F_{Y1}$) ON A PRINTED PRODUCT TO BE CHECKED AND ON PRIMARY PRINTS — 40

↓

PRINTING ADDITIONAL COMBINATION MEASURING FIELDS ON THE PRIMARY PRINTS, IN WHICH THE FUNDAMENTAL COLORS ARE SUPERPRINTED AT VARIED DEGREES OF SURFACE COVERAGE $\{(F_{C2} = F_{C1} + \Delta F_{C2}, F_{M1}, F_{Y1}), (F_{C1}, F_{M3} = F_{M1} + \Delta F_{M3}, F_{Y1}), (F_{C1}, F_{M1}, F_{Y4} = F_{Y1} + \Delta F_{Y4})\}$, WHEREIN EACH FUNDAMENTAL COLOR IS VARIED AT LEAST ONCE, AND AT LEAST ONE OTHER FUNDAMENTAL COLOR IS VARIED IN EACH THE ADDITIONAL COMBINATION MEASURING FIELD — 42

↓

PRINTING AT LEAST ONE SINGLE-COLOR FULL-TONE FIELD FOR EACH FUNDAMENTAL COLOR ON EACH OF THE PRIMARY PRINTS — 44

↓

PRINTING AT LEAST ONE SINGLE-COLOR HALF-TONE FIELD FOR EACH FUNDAMENTAL COLOR ON EACH OF THE PRIMARY PRINTS, WHEREIN THE SINGLE-COLOR HALF-TONE FILEDS HAVE, IN THEIR CORRESPONDING FUNDAMENTAL COLOR, A DEGREE OF SURFACE COVERAGE ($F_{C1}$, $F_{M1}$, $F_{Y1}$) THAT CORRESPONDS TO THAT OF THE SAME COLOR IN THE FIRST COMBINATION MEASURED FIELD, AND/OR THE SINGLE-COLOR HALF-TONE FIELDS HAVE, IN THEIR CORRESPONDING FUNDAMENTAL COLOR, A DEGREE OF SURFACE COVERAGE ($F_{C2}$, $F_{M3}$, $F_{Y4}$) THAT CORRESPONDS TO THE VARIED DEGREE OF SURFACE COVERAGE OF THE SAME COLOR IN THE ADDITIONAL COMBINATION MEASURING FIELD — 46

↓

Fig. 2b

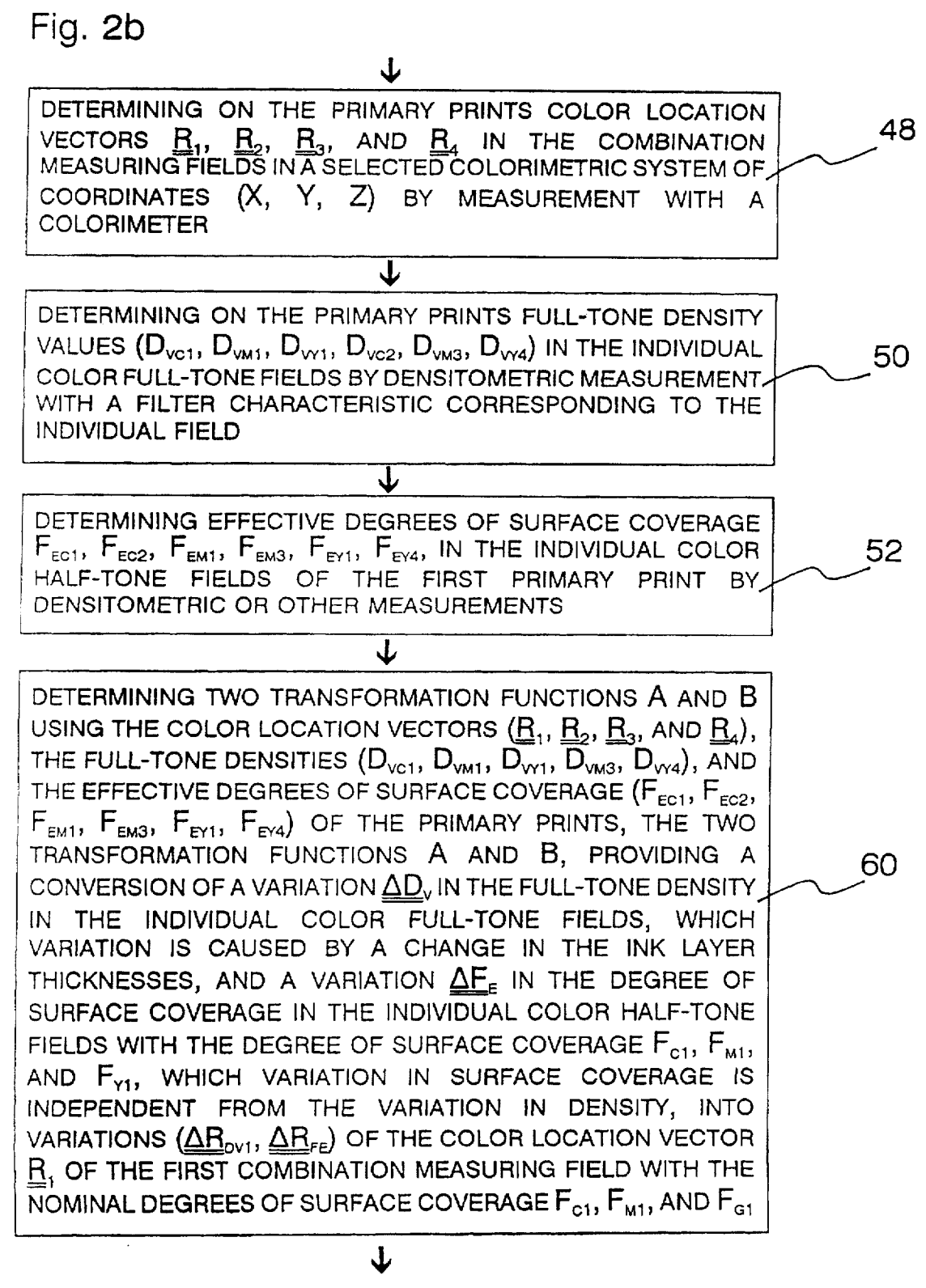

↓

DETERMINING ON THE PRIMARY PRINTS COLOR LOCATION VECTORS $\underline{\underline{R}}_1$, $\underline{\underline{R}}_2$, $\underline{\underline{R}}_3$, AND $\underline{\underline{R}}_4$ IN THE COMBINATION MEASURING FIELDS IN A SELECTED COLORIMETRIC SYSTEM OF COORDINATES (X, Y, Z) BY MEASUREMENT WITH A COLORIMETER — 48

↓

DETERMINING ON THE PRIMARY PRINTS FULL-TONE DENSITY VALUES ($D_{VC1}$, $D_{VM1}$, $D_{VY1}$, $D_{VC2}$, $D_{VM3}$, $D_{VY4}$) IN THE INDIVIDUAL COLOR FULL-TONE FIELDS BY DENSITOMETRIC MEASUREMENT WITH A FILTER CHARACTERISTIC CORRESPONDING TO THE INDIVIDUAL FIELD — 50

↓

DETERMINING EFFECTIVE DEGREES OF SURFACE COVERAGE $F_{EC1}$, $F_{EC2}$, $F_{EM1}$, $F_{EM3}$, $F_{EY1}$, $F_{EY4}$, IN THE INDIVIDUAL COLOR HALF-TONE FIELDS OF THE FIRST PRIMARY PRINT BY DENSITOMETRIC OR OTHER MEASUREMENTS — 52

↓

DETERMINING TWO TRANSFORMATION FUNCTIONS A AND B USING THE COLOR LOCATION VECTORS ($\underline{\underline{R}}_1$, $\underline{\underline{R}}_2$, $\underline{\underline{R}}_3$, AND $\underline{\underline{R}}_4$), THE FULL-TONE DENSITIES ($D_{VC1}$, $D_{VM1}$, $D_{VY1}$, $D_{VM3}$, $D_{VY4}$), AND THE EFFECTIVE DEGREES OF SURFACE COVERAGE ($F_{EC1}$, $F_{EC2}$, $F_{EM1}$, $F_{EM3}$, $F_{EY1}$, $F_{EY4}$) OF THE PRIMARY PRINTS, THE TWO TRANSFORMATION FUNCTIONS A AND B, PROVIDING A CONVERSION OF A VARIATION $\underline{\underline{\Delta D}}_V$ IN THE FULL-TONE DENSITY IN THE INDIVIDUAL COLOR FULL-TONE FIELDS, WHICH VARIATION IS CAUSED BY A CHANGE IN THE INK LAYER THICKNESSES, AND A VARIATION $\underline{\underline{\Delta F}}_E$ IN THE DEGREE OF SURFACE COVERAGE IN THE INDIVIDUAL COLOR HALF-TONE FIELDS WITH THE DEGREE OF SURFACE COVERAGE $F_{C1}$, $F_{M1}$, AND $F_{Y1}$, WHICH VARIATION IN SURFACE COVERAGE IS INDEPENDENT FROM THE VARIATION IN DENSITY, INTO VARIATIONS ($\underline{\underline{\Delta R}}_{DV1}$, $\underline{\underline{\Delta R}}_{FE}$) OF THE COLOR LOCATION VECTOR $\underline{\underline{R}}_1$ OF THE FIRST COMBINATION MEASURING FIELD WITH THE NOMINAL DEGREES OF SURFACE COVERAGE $F_{C1}$, $F_{M1}$, AND $F_{G1}$ — 60

↓

Fig. 2c

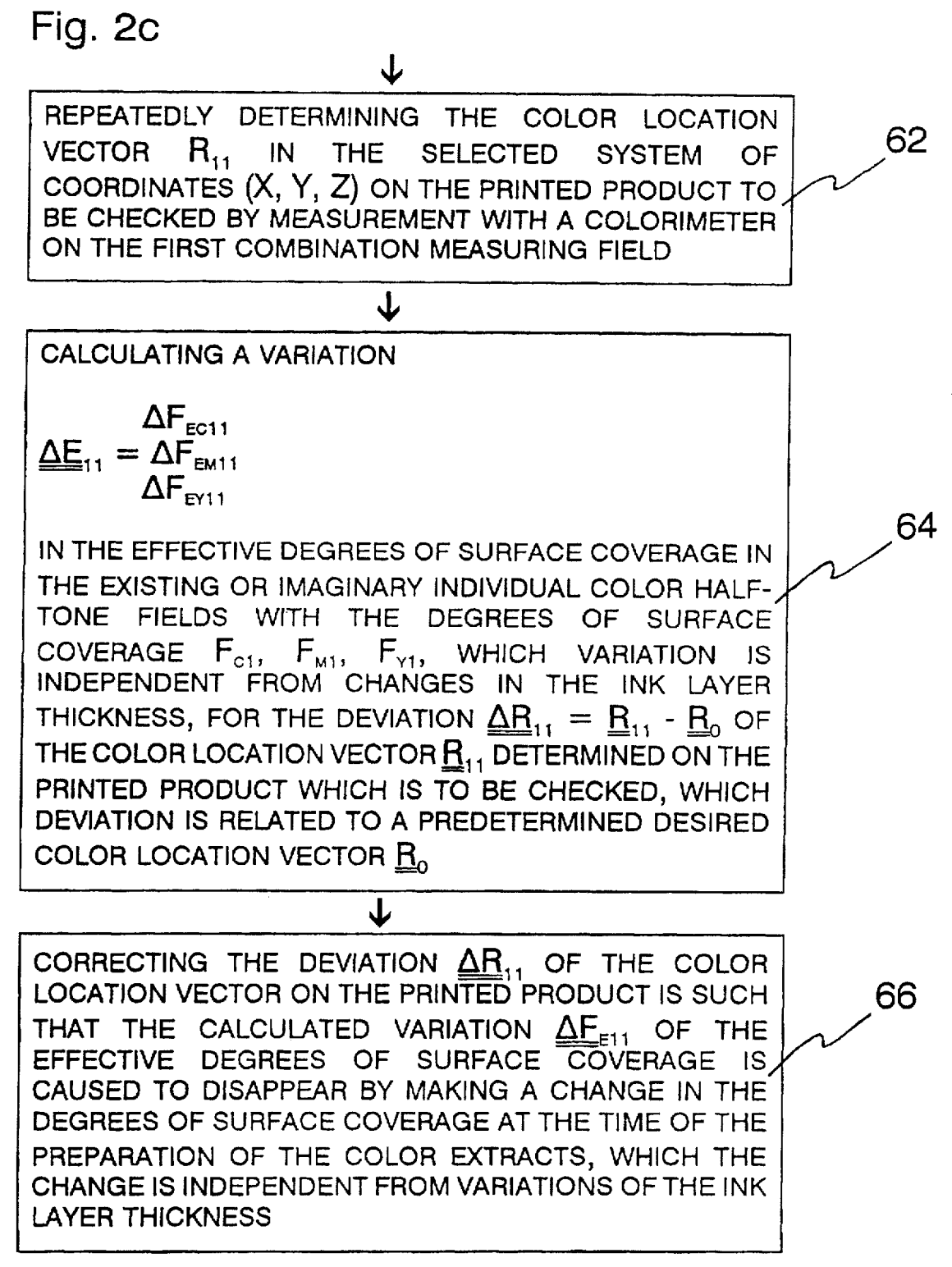

REPEATEDLY DETERMINING THE COLOR LOCATION VECTOR $R_{11}$ IN THE SELECTED SYSTEM OF COORDINATES (X, Y, Z) ON THE PRINTED PRODUCT TO BE CHECKED BY MEASUREMENT WITH A COLORIMETER ON THE FIRST COMBINATION MEASURING FIELD — 62

↓

CALCULATING A VARIATION $$\underline{\underline{\Delta E}}_{11} = \begin{matrix} \Delta F_{EC11} \\ \Delta F_{EM11} \\ \Delta F_{EY11} \end{matrix}$$

IN THE EFFECTIVE DEGREES OF SURFACE COVERAGE IN THE EXISTING OR IMAGINARY INDIVIDUAL COLOR HALF-TONE FIELDS WITH THE DEGREES OF SURFACE COVERAGE $F_{C1}$, $F_{M1}$, $F_{Y1}$, WHICH VARIATION IS INDEPENDENT FROM CHANGES IN THE INK LAYER THICKNESS, FOR THE DEVIATION $\underline{\underline{\Delta R}}_{11} = \underline{\underline{R}}_{11} - \underline{\underline{R}}_{0}$ OF THE COLOR LOCATION VECTOR $\underline{\underline{R}}_{11}$ DETERMINED ON THE PRINTED PRODUCT WHICH IS TO BE CHECKED, WHICH DEVIATION IS RELATED TO A PREDETERMINED DESIRED COLOR LOCATION VECTOR $\underline{\underline{R}}_{0}$ — 64

↓

CORRECTING THE DEVIATION $\underline{\underline{\Delta R}}_{11}$ OF THE COLOR LOCATION VECTOR ON THE PRINTED PRODUCT IS SUCH THAT THE CALCULATED VARIATION $\underline{\underline{\Delta F}}_{E11}$ OF THE EFFECTIVE DEGREES OF SURFACE COVERAGE IS CAUSED TO DISAPPEAR BY MAKING A CHANGE IN THE DEGREES OF SURFACE COVERAGE AT THE TIME OF THE PREPARATION OF THE COLOR EXTRACTS, WHICH THE CHANGE IS INDEPENDENT FROM VARIATIONS OF THE INK LAYER THICKNESS — 66

GROUP OF MEASURED FIELDS FOR DETERMINING COLOR DATA OF A PRINTED PRODUCT

FIELD OF THE INVENTION

The basic idea of color management is that colored originals are set determined in the digital preliminary stage of printing independently from output devices and materials. The colors are consequently described in a colorimetric system of coordinates standardized by the Commission Internationale de l'Eclairage (CIE), such as XYZ, CIELAB or CIELUV. If multicolor images thus defined are output on paper via a system calibrated in terms of color management, it is guaranteed that the appearance of the output as regards color will always be the same, completely independently from the output process used.

BACKGROUND OF THE INVENTION

Among other things, computer color printers, digital color copiers and digital proofing devices are currently used as output systems that can be calibrated. It is desirable to expand the concept of color management to conventional printing processes, such as newspaper offset, as well. The chain of actions consisting of the printing form preparation and the printing process is treated now as any other output device that can be calibrated. However, before this is achieved, it is still necessary to create the prerequisites for

- the systematic determination of the appearance of multicolor images as regards color in the offset printing of single editions of newspapers,
- the suppression or elimination of accidental deviations, and
- the compensation for systematic deviations.

Numerous solutions to the monitoring and the control of inking in multicolor offset printing have currently been known.

For example, EP 0 196 431 B1 discloses a process and a device for achieving a uniform printing result on an autotypically operating multicolor offset printing press. This solution is characterized by the measurement of ink layer thicknesses (full tone densities) and half-tone dot sizes (degrees of surface coverage) on measured fields, which are printed jointly for each printing ink in each ink-setting zone of the printing press. The color-guiding final control elements on the printing press are automatically adjusted based on these densitometric measured values.

The necessity to jointly print a plurality of measured fields in each inksetting zone has led to the above-mentioned process having been used to date exclusively for jobbing offset printing, because in jobbing rotary printing, the measured fields can be printed outside the printing area, i.e., on a margin, which is cut off at the end. This prerequisite is not met in newspaper offset. No margin is cut off here, and any measured field printed must be accommodated within the printing area, thus requiring space, which could otherwise be used for advertisements or editorial reports. Newspaper publishers are therefore reluctant to accept measured fields.

The high expense of equipment and the high labor cost, which is due to the measurement of the measured fields, can be considered to be another obstacle to the use of the above process in newspaper offset. If the measurement is to be performed in the rotary offset process on-line, i.e., automatically on the running web, an optical measuring head with automatic positioning is necessary for each side of the web. If the measurements were performed, instead, with commercially available manual densitometers or manual spectrophotometers, it would be necessary to use additional personnel specifically for the purpose of quality data collection in view of the great number of measured fields and the time required for the manual positioning of the measuring instrument. A systematically performed quality data collection cannot become successful in the offset printing of single editions of newspapers as long as it is associated with a high investment or a high additional manpower requirement.

The process described in EP 0 196 431 B1 has another disadvantageous property, because characteristics which are not directly related to the appearance of the printed product as regards color are measured with the full-tone and half-tone densities of the individual inks. This shortcoming can be eliminated by also providing and colorimetrically measuring so-called combination measured fields, i.e., measuring fields in which the fundamental colors involved in the printing are printed over each other in a half tone.

Colorimetric measured values thus obtained can be related to the XYZ color space based on the sensitivity function of the average human eye, or to the perceptionally equidistant CIELUV or CIELAB color spaces derived from the XYZ system, which were all standardized by the CIE (Commission Internationale de l'Eclairage).

The colorimetric measurement on combination measured fields offers the advantage that it provides information on the interaction of all the colors involved in a multicolor printing. The colorimetric measured values immediately provide information on the appearance of the combination measured field or the printed product as regards color for the human observer. Another advantage is the fact that the combination measured fields can possibly be replaced with image areas with a suitable image structure. In contrast to densitometric methods, the colorimetric measurement methods have the disadvantage of not providing any direct information for process control. For example, it is not possible to infer from a deviation of the color location how the color-guiding on the printing press must be corrected to reduce the deviation.

Methods were developed, with which deviations in the color location can be converted into variations of the layer thicknesses or of the densities of the individual colors involved in printing. Thus, EP 0 321 402 A1 and EP 0 408 507 A1 disclose linear transformations for converting variations of the full-tone or half-tone densities into variations of the color location of combination measured fields in the CIELUV or CIELAB color spaces.

These transformations make it possible, e.g., to calculate the change in the full-tone densities of single-color measured field, which change is necessary to compensate the deviation of the color location in the combination measured field, from a deviation of the color location of a combination measured field on a proof sheet. Consequently, the strategy followed is to correct undesired deviations of the color location of combination measured fields exclusively by making suitable changes in the ink layer thicknesses of the colors involved in the printing process.

The limitation to changes in the ink layer thicknesses in EP 0 408 507 A1 appears to be somewhat arbitrary, because the correction of color location deviations can also be achieved, in principle, by appropriately changing the degrees of surface coverage of the individual printing inks. This can happen, e.g., in the digital preliminary stage of printing, when the color separations are examined. This possibility is particularly interesting when an essential portion of the color location deviations observed for a certain combination measured field is symmetrical, i.e., not exclusively accidental. Another advantage is the fact that a change in the degrees of surface coverage of the printing inks is often easier to manage during the calculation of the color separations than a change in the ink layer thicknesses used on the printing press. The idea of taking into account individual printing characteristics of individual inking mechanisms in the calculation of the color separations has been known from DE 42 09 165 A1. However, no relation is established there to colorimetric measured values on combination measured fields or image areas.

It follows from the above explanations that the quality data collection and process optimization methods that are currently known and are intended predominantly for the jobbing offset printing of single editions cannot be extrapolated without any changes to the newspaper offset printing of single editions. This explains why it is still a common practice now in newspaper offset printing to leave the monitoring and the control of inking to the rather untrained, but definitely subjective eye of the printer.

SUMMARY AND OBJECTS OF THE INVENTION

An improvement in the objective methods discussed above is desirable, especially based on the following insight, for use in the offset printing of single editions of newspapers:

- The necessary number of measured fields should be reduced in order for the measured fields to occupy less space in the printing area of the newspaper.
- The expense of equipment and the labor cost for measuring the measured fields shall be reduced.
- The methods shall be based on a statistical check in the future. Measured fields will then be printed only in a few representative color zones, and the results will be extrapolated to the entire printing process. This complies with both above-described requirements.
- The measurement on image areas with a suitable image structure shall make the joint printing and measurement of special measured fields unnecessary to the extent possible.
- Both colorimetric and densitometric measured values should result from the same measurement. As a result, information on the appearance of the printed product as regards color and on the possibilities of correcting it in both the preliminary stage of printing and at the printing press can be derived at the same time.

The primary object of the present invention is to provide measured fields for color data collection of a printed product, which are suitable for color management in the rotary offset printing of single editions, and whose use in color management makes it possible to use especially a process which meets a few, several and preferably all the above-described requirements. The process and the measured fields or the measured field group or the measured field arrangement developed for it shall also be able to be used in the offset printing of single editions of newspapers.

According to the invention, a group of measured fields is provided for determining color data of a printed product, especially for color management in the rotary offset printing of single editions, with a plurality of measured fields, which are printed on a printed product to be checked or on a primary print in such a way that they can be optically scanned. The group of measured fields comprises:

a) a first combination measured field, in which the fundamental colors are superprinted with their degrees of surface coverage ($F_{c1}$, $F_{m1}$, $F_{y1}$);

b) additional combination measured fields, in which the fundamental colors are superprinted at varied nominal degrees of surface coverage $\{(F_{c2}=F_{c1}+\Delta F_{c2}, F_{m1}, F_{y1}), (F_{c1}, F_{m3}=F_{m1}+\Delta F_{m3}, F_{y1}), (F_{c1}, F_{m1}, F_{y4}=F_{y1}, +\Delta F_{y4})\}$, wherein each fundamental color is varied at least once, and at least one other fundamental color is varied in each additional combination measured field;

c) additionally at least one single-color full-tone field for each fundamental color;

d) additionally at least one single-color half-tone field for each fundamental color, wherein first single-color half-tone fields have, in their corresponding fundamental color, a degree of surface coverage ($F_{c1}$, $F_{m1}$, $F_{y1}$) that corresponds to that of the same color in the first combination measured field, and/or second single-color half-tone fields have, in their corresponding fundamental color, a degree of surface coverage ($F_{c2}$, $F_{m3}$, $F_{y4}$) that corresponds to the varied degree of surface coverage of the same color in the additional combination measured fields.

The invention further provides a process comprising the steps of:

a) jointly printing measured fields and/or image areas used as measured fields;

b) optically scanning the measured fields after the printing process;

c) evaluating the remitted light during scanning; and d) using a group of measured fields as noted above.

The invention also includes the process for color management in the rotary offset printing of single editions, comprising the steps of:

a) jointly printing measured fields and/or image areas used as measured fields;

b) optically scanning the measured fields after the printing process;

c) evaluating the remitted light during scanning;

d) providing the printed product to be checked and a plurality of primary prints prepared with intentionally different ink layer thicknesses with a first combination measured field each, in which the fundamental colors cyan, magenta and yellow are superprinted at their nominal degrees of surface coverage $F_{c1}$, $F_{m1}$, $F_{y1}$, e) providing the primary prints with additional combination measured fields, in which the fundamental colors are superprinted at the nominal degrees of surface coverage ($F_{c2}=F_{c1}+\Delta F_{c2}$, $F_{m1}$, $F_{y1}$), ($F_{c1}$, $F_{m3}=F_{m1}+\Delta F_{m3}$, $F_{y1}$), ($F_{c1}$, $F_{m1}$, $F_{y4}=F_{y1}+\Delta F_{y4}$), wherein each fundamental color is varied at least once, and at least one other fundamental color is varied in each additional combination measured field;

f) providing the primary prints additionally with at least one single-color full-tone field per fundamental color; and g) providing the primary prints additionally with at least one single-color half-tone field per fundamental color, wherein first single-color half-tone fields have, in their corresponding fundamental color, a degree of surface coverage ($F_{c1}$, $F_{m1}$, $F_{y1}$) that corresponds to that of the same color in the first combination measured field, and/or second single-color halftone fields have, in their corresponding fundamental color, a degree of surface coverage ($F_{c2}$, $F_{m3}$, $F_{y4}$) that corresponds to the varied degree of surface coverage of the same color in the additional combination measured fields.

Even though the solution is characterized by the special requirement of newspaper printing, this does not rule out a profitable application in other areas, such as rotary jobbing offset printing, at all.

The process according to the present invention is based on the following considerations:

For a given paper and ink material, the appearance of a surface printed by multicolor superprinting as regards color is determined by the interaction of the ink layer thickness and the effective degree of surface coverage of all printing inks located one on top of another.

The combined effect of the printing inks involved is determined by a single optical scanning by colorimetric measurement on a combination measured field, i.e., on a measured field in which a plurality of inks in half tones or full tones are printed one over the other.

The contribution of the individual ink can be best characterized by its layer thickness and by the half-tone dot size. The densitometric equivalent for this is the full-tone density and the effective degree of surface coverage in the print. These two parameters are measured in conventional test methods per printing ink involved by density measurement on a single-color control field in full tone and half tone each. The degree of surface coverage is usually calculated according to the well-known Murray-Davies formula.

If the quality data collection in the offset printing of single editions is based exclusively on densitometric measurements, at least two single-color measured fields must consequently be printed as well. These measured fields are to be individually subjected to a density measurement. If information on the interaction of the ink layers is additionally required as well, additional densitometric measurements must be performed on additional two-color or three-color combination measured fields to determine the ink absorption. In three-color superprinting, this leads, e.g., to at least 10 optical scannings.

The expense is reduced if the half-tone density of a color is considered instead of the full-tone density and of the degree of surface coverage of the color in question. The half-tone density describes the combined effect of the other two influence variables. However, a differentiated investigation of the causes of variations is more difficult now.

There is a natural relationship between the colorimetric values determined on a combination measured field, on the one hand, and the densitometric parameters, namely, the full-tone density and the degree of surface coverage of the individual inks, on the other hand. This relationship is generally complicated. However, it can be simplified if only variations of the variables of interest around a defined working point are considered, which is usually sufficient in printing practice in light of the corresponding standardization efforts.

The following procedure is proposed:

The systematic relationship between the variations of colorimetric parameters on combination measured fields and variations of the full-tone density and the degree of surface coverage of the individual inks is determined empirically on primary prints for a given paper, a given ink material, a defined printing press, and a given working point. The working point is advantageously characterized by the nominal degrees of surface coverage of the individual inks in the combination measured field, i.e., the degrees of surface coverage of the combination measured field on the film originals or on the printing plates.

The result of the evaluation of the primary prints thus forms a transformation function, per working point, which converts variations of the full-tone density in the single-color full-tone fields and variations in the effective degrees of surface coverage in the single-color halftone fields into variations of the color location vector of the combination measured field.

One ancillary result of the evaluation of the primary print is a breakdown of the variations in the color location vector according to their causes, i.e., according to the variations in the full-tone density in the single-color full-tone fields and the variations in the effective degrees of surface coverage in the single-color half-tone fields. The statistical ratio of the cause-related contributions of the variations in the color location vector can also be derived from this breakdown.

Thus, only the combination measured field is jointly printed and measured colorimetrically on the printed product that is to be checked and optimized with respect to its appearance as regards color. The color location deviation or color location variation is calculated from this measured actual color location by subtracting a predetermined desired color location.

The color location variation on the printed product is compensated by adjusting the color-guiding final control elements on the printed press, on the one hand, and by changing the degrees of surface coverage during the preparation of the color separations, on the other hand. The adjustment of the color-guiding final control elements are particularly suitable for compensating the accidental components of the color location variation, while changing the degrees of surface coverage during the preparation of the color separations presents itself exclusively for compensating the systematic components of the color location variation, i.e., the components that remain unchanged over a plurality of print jobs.

Measured fields or image areas used as measured fields are jointly printed for color management, and they are optically scanned after the printing. The remitted light is evaluated.

According to the present invention, the printed product to be checked and a plurality of primary prints intentionally prepared with different ink layer thicknesses have a first combination measured field each, in which the fundamental colors, usually the three colors cyan, magenta and yellow, are superprinted at the nominal degrees of surface coverage ($F_{c1}$, $F_{m1}$, $F_{y1}$).

The primary prints additionally have combination measured fields, in which the fundamental colors are superprinted at the nominal degrees of surface coverage ($F_{c2}=F_{c1}+\Delta F_{c2}$, $F_{m1}$, $F_{y1}$) ($F_{c1}$, $F_{m3}=F_{m1}+\Delta F_{m3}$ $F_{y1}$), ($F_{c1}$, $F_{m1}$, $F_{y4}=F_{y1}+\Delta F_{y4}$). At least one other fundamental color is varied in each of these additional combination measured fields, e.g., the first fundamental color is varied by the value $\Delta F_{c2}$ in the second field, the second fundamental color is varied by the value $\Delta F_{m3}$ in the third field, and the third fundamental color is varied by the value $\Delta F_{y4}$ in the fourth field. The number of the additional combination measured fields and the number of colors per combination measured field preferably correspond to the number of the fundamental colors.

The primary prints additionally have one single-color half-tone field each per fundamental color in the fundamental colors, which field has, in its corresponding color, a degree of surface coverage that corresponds to that of the same color in the first combination measured field. They preferably have additionally at least one more single-color half-tone field per fundamental color. The degree of surface coverage of the other single-color half-tone field corresponds to the varied degree of surface coverage of the corresponding additional combination measured field. In the above nomenclature, the single-color half-tone fields thus have the degrees of surface coverage $F_{c1}$, $F_{c2}$, $F_{m1}$, $F_{m3}$, $F_{y1}$, and $F_{y4}$ in the preferred embodiment.

The primary prints also contain at least one single-color full-tone field per fundamental color, and preferably exactly one field per fundamental color.

The primary print or primary prints may be printed separately or even in the printed product. The measured fields form a group of measured fields, which is preferably arranged in the form of a measured field block.

The color location vectors $\underline{R}_1$, $\underline{R}_2$, $\underline{R}_3$ and $\underline{R}_4$ each can be advantageously determined in a selected colorimetric system of coordinates on this primary print by measurement with a calorimeter on the combination measured fields. Furthermore, the effective degrees of surface coverage in the print, $F_{ec1}$, $F_{ec2}$, $F_{em1}$, $F_{em3}$, $F_{ey1}$ and $F_{ey4}$ can be determined in the single-color half-tone fields by densitometric or other measurements, and the full-tone density values $D_{Vc1}$, $D_{Vma}$ and $D_{Vy1}$ can likewise be determined in the single-color full-tone fields by densitometric measurement with a filter characteristic corresponding to the individual field.

The color location vectors, the full-tone densities, and the effective degrees of surface coverage of the primary prints are used according to the present invention to determine two transformation functions A and B, which convert a variation $\Delta\underline{D}_{V1}$ of the full-tone density in the single-color full-tone fields, which variation is due to a change in the ink layer thicknesses, and a variation $\Delta\underline{F}_{e1}$ (which is independent from the variation of the full-tone density) of the effective degrees of surface coverage in the single-color half-tone densities at the degrees of surface coverage $F_{c1}$, $F_{m1}$ and $F_{y1}$ into variations of the color location vector of the first combination measured field at the degrees of surface coverage ($F_{c1}$, $F_{m1}$, $F_{y1}$).

In the process according to the present invention, the color location vector in the system of coordinates selected is repeatedly determined on the printed product to be checked by measurement with a calorimeter on the first combination measured field, and a combination of a variation $\Delta\underline{D}_{V11}$ of the full-tone density in the existing or imaginary single-color full-tone fields, which variation is due to a change in the ink layer thicknesses, and of a variation $\Delta\underline{F}_{e11}$ (which is independent from the other variation) of the effective degrees of surface coverage in existing or imaginary single-color half-tone fields at the nominal degrees of surface coverage is calculated for the deviation of the color location vector $\Delta\underline{R}_{11}$ determined on the printed product, which deviation is related to a predetermined desired color location vector.

The deviation $\Delta\underline{R}_{11}$ of the color location vector exactly corresponds according to the present invention to the combined effect of the variations $\Delta\underline{D}_{V11}$ and $\Delta\underline{F}_{e11}$ via the transformation functions A and B.

Furthermore, the present invention is characterized in that the deviation of the color location vector $\Delta\underline{R}_{11}$ on the printed product is corrected in the sense that the calculated variation $\Delta\underline{D}_{V11}$ of the full-tone densities is caused to disappear by adjusting the color-guiding final control elements on the printing press, on the one hand, and that the calculated variation $\Delta\underline{F}_{e11}$ of the effective degrees of surface coverage is caused to disappear by changing the degrees of surface coverage during the preparation of the color separations; as well as in that the transformation functions A and B are linear, i.e., they are characterized by two 3×3 matrices $\underline{\underline{A}}$ and $\underline{\underline{B}}$, and that the equations $\Delta\underline{R}_1=\underline{\underline{A}}\Delta\underline{D}_{Vi}+\underline{\underline{B}}\Delta\underline{F}_{e1}$ and $\Delta\underline{R}_{11}=\underline{\underline{A}}\Delta\underline{D}_{V11}+\underline{\underline{B}}\Delta\underline{F}_{e11}$ are valid.

It is also advantageous that a combination of a variation $\Delta\underline{D}_{V11}$ of the full-tone densities caused by a change in the ink layer thicknesses and of a variation $\Delta\underline{F}_{e11}$ (which is independent from that variation) of the degrees of surface coverage is calculated for a deviation $\Delta\underline{R}_{11}$ of the color location vector determined on the printed product such that $\Delta\underline{R}_{11}=\underline{\underline{A}}\Delta\underline{D}_{V11}+\underline{\underline{B}}\Delta\underline{F}_{e11}$ is at the same time valid, wherein $\underline{\underline{A}}\Delta\underline{D}_{V11}$ corresponds to the accidental component of $\Delta\underline{R}_{11}$ and $\underline{\underline{B}}\Delta\underline{F}_{e11}$ represents the systematic component of $\Delta\underline{R}_{11}$, i.e., the component that is constant over a plurality of consecutive print jobs.

It is also advantageous that a variation $\Delta\underline{D}_{V11}$ of the full-tone densities, which is caused by a change in the ink layer thicknesses, is calculated for a deviation $\Delta\underline{R}_{11}$ of the color location vector determined on the printed product, and the variation $\Delta\underline{R}_{11}$ exactly corresponds to the effect of the variation $\Delta\underline{R}_{V11}$ via the transformation function A; and that the deviation of the color location vector $\Delta\underline{A}_{11}$ on the printed product is corrected in the sense that the calculated variation $\Delta\underline{R}_{V11}$ of the full-tone densities is caused to disappear by adjusting the color-guiding final control elements on the printing press.

Finally, it is also advantageous that a variation $\Delta\underline{F}_{e11}$ of the effective degrees of surface coverage in existing or imaginary single-color half-tone fields at the nominal degrees of surface coverage $F_{c1}$, $F_{m1}$, $F_{y1}$, which variation is independent from changes in the ink layer thicknesses, is calculated for a deviation $\Delta\underline{R}_{11}$ of the color location vector determined on the printed product, and the variation $\Delta\underline{R}_{11}$ exactly corresponds to the effect of the variation $\Delta\underline{F}_{e11}$ via the transformation function B alone; and that the deviation of the color location vector $\Delta\underline{R}_{11}$ on the printed product is corrected in the sense that the calculated variation $\Delta\underline{F}_{e11}$ of the effective degrees of surface coverage is compensated as a consequence of a change in the degrees of surface coverage, which is independent from variations in the ink layer thickness, during the preparation of the color separations.

The present invention can be advantageously used in the rotary offset printing of single editions.

A group of measured fields for determining color data of a printed product, especially for color management in the rotary offset printing of single editions, has a plurality of measured fields, which are provided on a printed product to be checked or on a primary print (calibration/reference print) in such a way that they can be optically scanned.

According to the present invention, this group of measured fields includes a first combination measured field, in which the fundamental colors are superprinted at their nominal degrees of surface coverage; additional combination measured fields, in which the fundamental colors are superprinted at varied nominal degrees of surface coverage, wherein each fundamental color is varied at least once and at least one other fundamental color is varied in each additional combination measured field; as well as additional single-color half-tone fields in the fundamental colors, wherein first single-color half-tone fields have, in their corresponding fundamental color, a degree of surface coverage that corresponds to that of the same color in the first combination measured field. Second single-color half-tone fields are preferably provided; they have, in their corresponding fundamental color, a degree of surface coverage that corresponds to the varied degree of surface coverage of the same color in the additional combination measured fields, and, finally, at least one single-color full-tone field is additionally provided for each fundamental color as well.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2*a–c* are a flow diagram illustrating the steps of the invention.

DETAILED DESCRIPTION OF THE PREFERRED EMBODIMENT

Figure 1B:
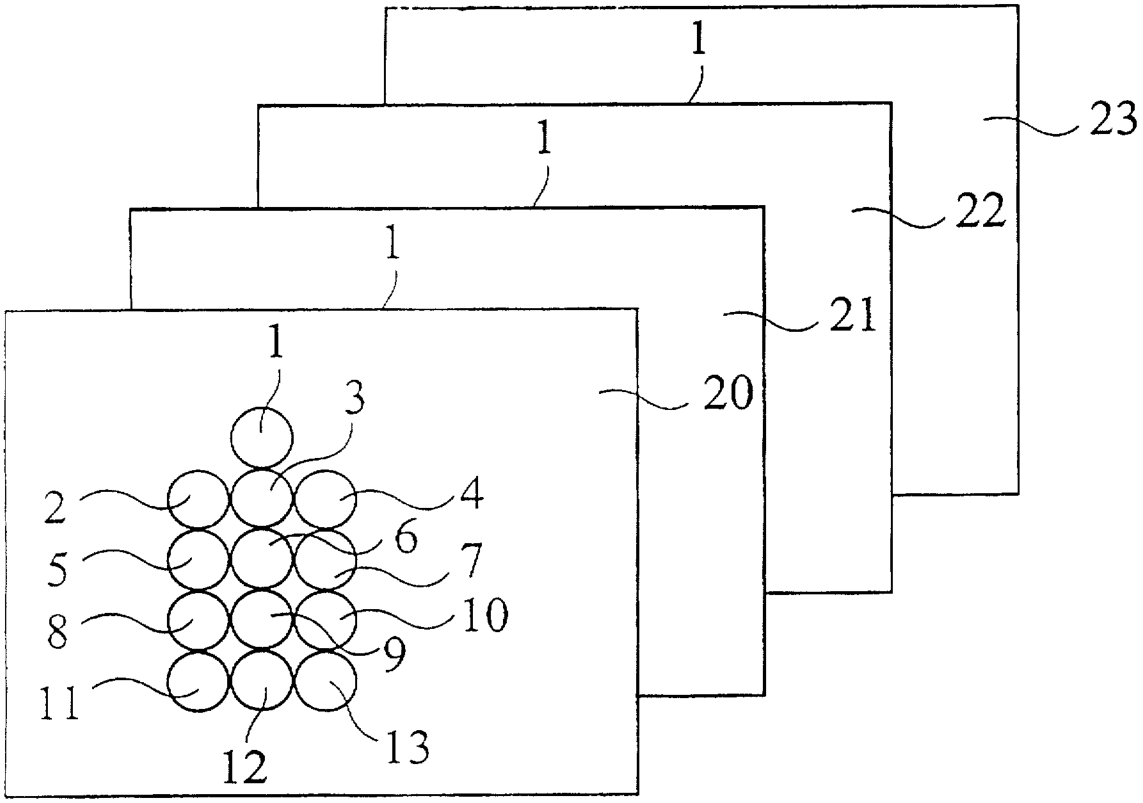
FIG. 1 is a schematic view of primary prints with measured fields and a printed product with combination measured field.
Figure 1A:
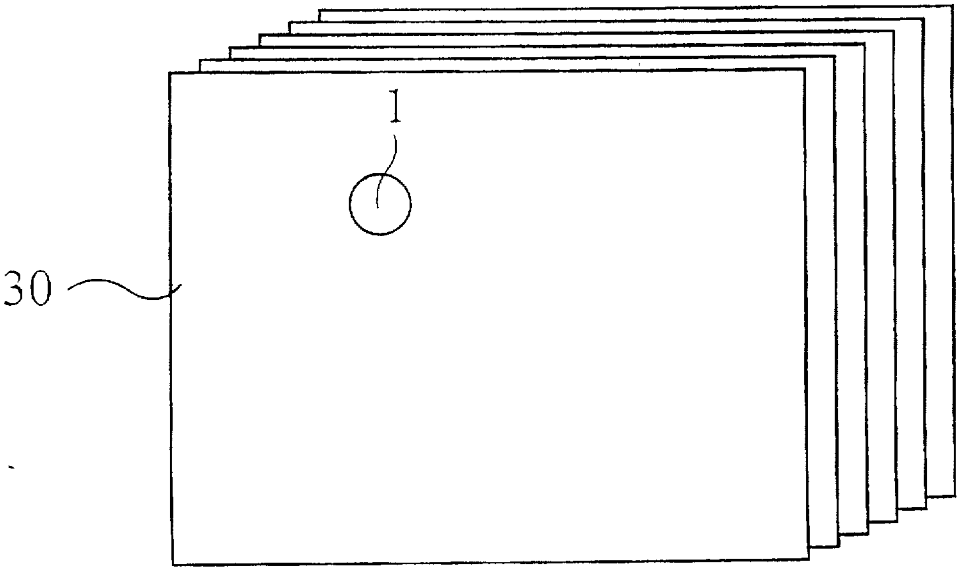

The mode of operation of the process according to the present invention will be explained in greater detail on the basis of FIG. 1 as well as the process flow diagram of FIG. 2*a–c*.

A primary print 20 contains a block of measured fields consisting of 13 measured fields:

- The fundamental colors cyan, magenta and yellow are superprinted at the nominal degrees of surface coverage ($F_{c1}$, $F_{m1}$, $F_{y1}$) in a first three-color combination measured field 1 as indicated at process step 40. The fundamental colors cyan, magenta and yellow are likewise superprinted in another three combination measured fields 2, 3, 4 but this time at as indicated at process step 42 varied nominal degrees of surface coverage ($F_{c2}=F_{c1}+\Delta F_{c2}$, $F_{m1}$, $F_{y1}$), ($F_{c1}$, $F_{m3}=F_{m1}+\Delta F_{m3}$, $F_{y1}$), ($F_{c1}$, $F_{m1}$, $F_{y4}=F_{y1}+\Delta F_{y4}$). Consequently, the nominal degree of surface coverage of exactly one fundamental color is varied in each of the combination measured fields 2, 3 and 4 relative to the combination measured field 1, i.e., the degree of surface coverage of cyan is varied by $\Delta F_{c2}$ in combination measured field 2, that of magenta is varied by $\Delta F_{m3}$ in combination measured field 3, and that of yellow by $\Delta F_{y4}$ in combination measured field 4. $\Delta F_{m3}$ and $\Delta F_{y4}$ may have either a positive or negative sign.
- Another three single-color fields 5, 6 and 7 contain the full tones of cyan, magenta and yellow. This is shown at step 44
- Six single-color fields are printed with half tones at step 46, namely, fields 8 and 11 in cyan at the nominal degrees of surface coverage $F_{c1}$, and $F_{c2}$, fields 9 and 12 in magenta at the nominal degrees of surface coverage $F_{m1}$ and $F_{m3}$, as well as fields 10 and 13 in yellow at the nominal degrees of surface coverage $F_{y1}$, and $F_{y4}$.

Of the measured fields described, the printed product 30 to be checked and optimized in the edition contains at least the combination measured field 1, in which the fundamental colors cyan, magenta and yellow are superprinted at the nominal degrees of surface coverage ($F_{c1}$, $F_{m1}$, $F_{y1}$). An image area of identical image structure may also be used, in principle, as a combination measured field.

The primary print 20 is printed under standardized conditions with respect to the ink material, the ink layer thickness and the increase in tonality, i.e., the increase in the degree of surface coverage from the film original or the printing plate to the print. These conditions were specified for the printing of single editions by, e.g., UGRA in Switzerland or FOGRA in Germany. Whether the process according to the present invention is used in the offset printing of newspapers or in jobbing offset printing is irrelevant for the principle of the mode of action. The only thing that is essential is that the primary print 20 be prepared according to the same standard as the edition, i.e., the printed product to be checked and optimized.

Additional primary prints 21, 22 and 23 also contain a block of measured fields. The blocks of measured fields of the primary prints 20 through 23 are identical in terms of the arrangement of the measured fields and their image structure. The preparation of the primary prints 21, 22 and 23 deviates from the applicable printing standard in the sense that, compared with the primary print 20, the ink layer thickness of exactly one of the fundamental colors cyan, magenta and yellow is varied per primary print. The ink layer thickness of cyan deviates on primary print 21, that of magenta deviates on primary print 22, and that of yellow deviates on primary print 23. The deviations may be, in principle, positive or negative.

Another condition is to be satisfied when the primary prints 20 through 23 are prepared as well. Besides the blocks of measured fields, the primary prints also must have other surfaces printed with all fundamental colors in order to guarantee sufficient ink take-off at the site of the block of measured fields in the direction of movement of the paper. The layout of these surfaces is freely selectable. Analogous considerations apply to the ink take-off for the printed product 30 as well.

The two most important effects on the appearance of the combination measured field 1 as regards color can now be quantitatively determined by means of the primary prints 20 through 23. These are

- the variations in the full-tone densities of cyan, magenta and yellow, which are linked with changes in the ink layer thicknesses, as well as the variations in the effective degrees of surface coverage of cyan, magenta and yellow in the print, which are independent from changes in the ink layer thicknesses.

The effect of the ink layer thicknesses is manifested here in the differences in colorimetric and densitometric measured values among the different primary prints. In contrast, the effect of the variations in the degrees of surface coverage, which variations are independent from changes in the ink layer thicknesses, is noticeable in the differences of the measured values among the different measured fields on the same primary print.

In determining the dependence of the appearance of the combination measured field 1 as regards color on the full-tone densities and on the degrees of surface coverage of the fundamental colors, two transformation functions are to be determined, namely,

- a first transformation function A, which converts a variation in the full-tone densities caused by a change in the ink layer thicknesses into the variation in the color location of the combination measured field, which latter variation results from that variation, and
- a second transformation function B, which images a variation in the effective degrees of surface coverage, which is independent from changes in the ink layer thicknesses, into the variation in the color location of the combination measured field, which variation results from it.

In the general case, the transformation functions A and B are nonlinear. Since usually one deals with relatively small variations around a standardized operating point in printing practice, it is permissible to linearize the relationships. In the interest of clarity, the process according to the present invention will be explained below on the basis of a linearized model. This does not affect the desirability of generalizing formulations for linear and nonlinear systems.

The transformation functions A and B are determined at step 60. This requires steps 48, 50, and 52 described below.

The following procedure may be used to determine the transformation functions A and B:

A colorimetric system of coordinates, preferably XYZ, is specified for the colorimetric measurements. CIELAB or CIELUV is also possible, in principle. It is important to always use the same system to indicate all colorimetric measured values. The explanations below are based on the example of XYZ standard color values for the sake of simplicity.

The XYZ standard color values are measured on the combination measured fields 1 through 4 of primary print 20. Four color location vectors $$\underline{R} = \begin{bmatrix} X \\ Y \\ Z \end{bmatrix}$$

are obtained, namely, $\underline{R}_1$ for measured field 1, $\underline{R}_2$ for measured field 2, $\underline{R}_3$ for measured field 3, and $\underline{R}_4$ for measured field 4. This occurs at step 48 in FIG. 2

Color densities are measured, at step 50 of FIG. 2 on the single-color fields 5 through 13 of primary print 20, and the effective degrees of surface coverage in the measured fields 8 through 13 are calculated from the well-known Murray-Davis equation. Three full-tone density values are thus obtained, namely, $D_{Vc1}$ for measured field 5, $D_{Vm1}$ for measured field 6, and $D_{Vy1}$ for measured field 7. Furthermore, six values are obtained for the effective degrees of surface coverage in the print, at step 52, namely, $F_{ec1}$ for measured field 8, $F_{ec2}$ for measured field 11, $F_{em1}$ for measured field 9, $F_{em3}$ for measured field 12, $F_{ey1}$ for measured field 10, and $F_{ey4}$ for measured field 13.

The XYZ standard color values are measured on the combination measured field 1 of the primary prints 21 through 23. Three color location vectors $$\underline{R} = \begin{bmatrix} X \\ Y \\ Z \end{bmatrix}$$

are obtained, namely, $\underline{R}_{21}$ for primary print 21, $\underline{R}_{22}$ for primary print 22, and $\underline{R}_{23}$ for primary print 23.

The full-tone density for cyan is measured on the single-color field 5 of primary print 21. The value $D_{vc2}$ is obtained.

The full-tone density for magenta is measured on the single-color field 6 of the primary print 22. The value $D_{vm3}$ is obtained.

The full-tone density for yellow is measured on the single-color field 7 of the primary print 23. The value $D_{Vy4}$ is obtained.

Using the definitions $$\underline{\Delta R}_{DVI} = [\underline{R}_{21} - \underline{R}_1 \; \underline{R}_{22} - \underline{R}_1 \; \underline{R}_{23} - \underline{R}_1]$$

-continued $$\underline{\underline{\Delta D}} = \begin{bmatrix} D_{vc2} - D_{vc1} & 0 & 0 \\ 0 & D_{vm3} - D_{vm1} & 0 \\ 0 & 0 & D_{vy4} - D_{vy1} \end{bmatrix}$$

$$\underline{\Delta R} = \underline{R}_2 - \underline{R}_1 \; \underline{R}_3 - \underline{R}_1 \; \underline{R}_4 - \underline{R}_1 \text{ and}$$

$$\underline{\underline{\Delta F}} = \begin{bmatrix} F_{ec2} - F_{ec1} & 0 & 0 \\ 0 & F_{em3} - F_{em1} & 0 \\ 0 & 0 & F_{ey4} - F_{ey1} \end{bmatrix}$$

it is possible to describe the linearized relationships between the measured variables by the following two equations:

$$\underline{\Delta R}_{DV} = \underline{\Delta A D}_V$$

$$\underline{\Delta R}_{Fc} = \underline{B \Delta F}_{e}$$

Here the two 3×3 matrices $\underline{\underline{A}}$ and $\underline{\underline{B}}$ stand for transformation functions A and B sought. To arrive at the transformation functions, we must consequently solve the latter two equations only for $\underline{\underline{A}}$ and $\underline{\underline{B}}$:

$$\underline{\underline{A}} = \underline{\Delta R}_{DV} \underline{\Delta D}_V^{-1}$$

$$\underline{\underline{B}} = \underline{\Delta R}_{Fe} \underline{\Delta F}_e^{-1}$$

By evaluating the primary prints 20 through 23, we have thus determined the quantitative relationship between variations in the full-tone density of the fundamental colors, which are due to changes in the ink layer thicknesses, and variations in the degree of surface coverage of the fundamental colors, which are independent from changes in the ink layer thicknesses, on the one hand, and variations in the color location vector in the combination measured field 1, on the other hand.

The matrix $\underline{\underline{B}}$ is now calculated on the basis of the matrices $\underline{\Delta R}_{Fe}$ and $\underline{\Delta F}_e$ according to the process just described. The matrices $\underline{\Delta R}_{Fe}$ and $\underline{\Delta F}_e$ are defined here by measured values, which originate exclusively from the primary print 20. This means that the matrix $\underline{\underline{B}}$ can be completely determined on the basis of a single primary print. In an expansion of the process, it would be possible to determine a separate matrix $\underline{\underline{B}}$ each for a plurality of primary prints, and subsequently to form the mean value for all $\underline{\underline{B}}$. It would be possible to reduce the effect of accidental errors in measurement by doing so.

The transformation functions obtained on the primary prints can now be used profitably when the quality of the printing of single editions is to be monitored and optimized. The prerequisite for this is that the combination measured field 1 be jointly printed in the printed product at the same nominal degrees of surface coverage for cyan, magenta and yellow.

The color location vector $\underline{R}_{11}$ in the combination measured field 1 is measured by measurement with a calorimeter on randomly selected copies of the printed product 30, at step 62. The color location deviation $\underline{\Delta R}_{11}$=$\underline{\Delta R}_{11}$ is subsequently calculated at step 64 by relating to a predetermined desired color location vector $\underline{R}$hd o. The desired color location vector may be either a measured value originating from a given original, or it may originate directly from the digital preliminary stage of printing.

If $\underline{\Delta R}_{11}$ is monitored over a fairly long time, i.e., over a plurality of productions, and the mean value $\underline{\Delta R}_{11M}$ is formed, $\underline{\Delta R}_{11M}$ will differ from zero in most cases. In prior-art processes for controlling inking in offset printing, $\underline{\Delta R}_{11M}$ would be compensated in each edition by adjusting the color-guiding final control elements on the printing press. If one now adopts the basic idea of color management in offset printing, one compensates the systematic color location deviation $\underline{\Delta R}_{11M}$ at step 66 not by adjusting the printing press, but by preparing the color separations in the preliminary stage of printing, by specifically influencing the degrees of surface coverage.

The following process is suitable for this:

Using the transformation function B, a variation $$\underline{\Delta F}_{e11} = \begin{bmatrix} \Delta F_{ec11} \\ \Delta F_{em11} \\ \Delta F_{ey11} \end{bmatrix}$$

in the effective degrees of surface coverage in cyan, magenta and yellow, which is independent from changes in the ink layer thickness, is determined:

$$\underline{\Delta F}_{e11} = \underline{\underline{B}}^{-1} \Delta R_{11m}$$

Using the printing characteristics applicable to the printing process, the changes in the nominal degrees of surface coverage of cyan, magenta and yellow in the color separation, which are necessary to compensate the systematic color location deviation $\underline{\Delta R}_{11m}$ can then be determined.

When the systematic color location deviation is compensated, there still remain accidental color location deviations $\underline{\Delta R}_{11z} = \underline{\Delta R}_{11} - \underline{\Delta R}_{11M}$. These must be compensated as well. The process according to the present invention makes it possible to proceed as follows on printing presses operating on the basis of color zones:

A variation $$\underline{\Delta D}_{V11} = \begin{bmatrix} \Delta D_{Vc11} \\ \Delta D_{Vm11} \\ \Delta D_{Vy11} \end{bmatrix}$$

in the full-tone densities in cyan, magenta and yellow, which is due to changes in the ink layer thickness, is determined by means of the transformation function A:

$$\underline{\Delta D}_{V11} = \underline{\underline{A}}^{-} \underline{\Delta R}_{11z}$$

By adjusting the color-guiding final control elements on the printing press, the ink layer thicknesses are adjusted such that $\underline{\Delta D}_{V11}$ tends toward zero. Two solutions are conceivable for eliminating $\underline{\Delta D}_{V11}$:

If the full-tone densities of cyan, magenta and yellow can be directly measured on the printed product 30, only the desired full-tone density values need to be changed by $-\Delta D_{Vc11}$, $-\Delta D_{Vm11}$ and $-\Delta D_{Vy11}$, respectively. Manual or automatic adjustment to the new desired full-tone density values will then cause $\underline{\Delta D}_{V11}$ to disappear.

If no full-tone densities can be measured on the printed product 30, the full-tone density variations $\Delta D_{Vc11}$, $\Delta D_{Vm11}$ and $\Delta D_{Vy11}$, respectively, are weighted with the degrees of surface coverage of cyan, magenta and yellow related to the color zone that contains the combination measured field 1. This leads to a direct indicator of the change in the amounts of inks of the fundamental colors used in the color zone, which change leads to the compensation of the full-tone density variation $\underline{\Delta D}_{V11}$. The amounts of inks can, in turn be varied by manual intervention or by automatic control.

It was shown by the application of the process according to the present invention just described that variations in the color location vector $R_{11}$ in the combination measured field 1 on the printed product 30 can be compensated during the preparation of the color separations in the preliminary stage of printing by a combination of changes in the ink layer thicknesses of the fundamental colors cyan, magenta and yellow with changes in the nominal degrees of surface coverage.

In contrast, the processes known before for compensating the color location variations are based on influencing the color guiding on the printing press. This has a decisive disadvantage compared with the process according to the present invention, which will be highlighted here in somewhat greater detail:

In multicolor printed products printed in practice, it is always necessary to print a plurality of mixed tones differing from one another in the nominal degrees of surface coverage of the fundamental colors in the same color zone. This situation is equivalent to the printed product 30 having a plurality of measured fields with different image structures in the same color zone.

It is required for all these measured fields that the color location variations be eliminated by adjusting the color-guiding final control elements on the printing press. Each measured field has a different color location variation in the normal case, and it therefore requires a different correction of the press setting. This condition can never be met, so that a compromise must ultimately be found, by which the color location variations can be somewhat reduced in all combination measured fields, but they can never be caused to disappear simultaneously.

The process according to the present invention has a significant advantage in this respect by permitting individual corrections for each measured field or for each image area corresponding to the image structure by varying the nominal degrees of surface coverage during the preparation of the color separations. The systematic components of the color location variation can thus be completely compensated.

The compensation of the systematic color location variations by varying the nominal degrees of surface coverage during the preparation of the color separations in the preliminary stage of printing is of particular interest in connection with more recent, printing press designs without color zones. These printing presses have a stable behavior in terms of the constancy of color guiding over a plurality of editions, but they can hardly be controlled by adjusting the color-guiding final control elements. Correction of color location deviations by influencing the nominal degrees of surface coverage in the preliminary stage of printing is the method of choice here.

The process according to the present invention makes it possible to use an image area with a suitable image structure instead of the combination measured field 1 on the printed product 30. The space occupied by the combination measured field 1 on the printed product can be saved as a result.

Another meaningful application of the process according to the present invention consists of jointly printing the complete block of measured fields of the primary prints in the printed product 30, so that the primary prints proper can be omitted.

It is possible to use, e.g., the first good copy of the edition instead of the primary print 20 to determine the transformation function B without any problem.

The transformation function A can then also be determined on the basis of three additional copies, which are taken from the edition, if sufficiently great variations in the full-tone density of the fundamental colors occur within the edition. The evaluation is performed by a generalization of the calculation scheme described above, which generalization consists in the matrix $\underline{\underline{\Delta D}}_V$ not being a diagonal matrix, but containing one variation of the full-tone densities of cyan, magenta and yellow each in all columns:

$$\underline{\underline{\Delta D}}_v = \begin{bmatrix} D_{vc2} - D_{vc1} & D_{vc3} - D_{vc1} & D_{vc4} - D_{vc1} \\ D_{vm2} - D_{vm1} & D_{vm3} - D_{vm1} & D_{vm4} - D_{vm1} \\ D_{vy2} - D_{vy1} & D_{vy3} - D_{vy1} & D_{vy4} - D_{vy1} \end{bmatrix}$$

The accuracy of the estimation of the transformation function A can be improved by evaluating a greater number of random samples from the edition. The number of columns in the matrices $\underline{\underline{\Delta R}}_{DV}$ and $\underline{\underline{\Delta D}}_V$ will then increase corresponding to the number of the random samples additionally evaluated. However, the matrix equation obtained as a result is redundant and must be solved for $\underline{\underline{A}}$ according to the methods of the balancing calculation.

The type of the measuring instruments used to obtain the measured data is irrelevant for the process according to the present invention. For example, it makes, in principle, no difference whether densitometric values are determined by means of a densitometer, a spectrophotometer, a video camera or any other suitable device. Analogously, colorimetric measurements may be performed with spectrophotometers, three-range calorimeters, video cameras or other suitable devices, without prejudice to the present invention. The type of the auxiliary means with which the further processing of the measured data is performed is also irrelevant.

The process according to the present invention can also be expanded in the direction of a four-color superprinting by also allowing a portion of the printing ink black in the combination measured fields on the primary prints 20 through 23 and on the printed product 30. The only condition is that the nominal degree of surface coverage of black be the same on all four combination measured fields.

What is claimed is:

1. A process comprising the steps of:

printing a first combination measuring field, in which the fundamental colors are superprinted with a degree of surface coverage ($F_{c1}$, $F_{m1}$, $F_{y1}$) on a printed product to be checked and on primary prints including a first primary print as well as on a plurality of additional primary prints, said additional primary prints being printed with different ink layer thicknesses;

printing additional combination measuring fields on said primary prints, in which the fundamental colors are superprinted at varied degrees of surface coverage {($F_{c2}=F_{c1}+\Delta F_{c2}$, $F_{m1}$, $F_{y1}$), ($F_{c1}$, $F_{m3}=F_{m1}+\Delta F_{m3}$, $F_{y1}$), ($F_{c2}$, $F_{m1}$, $F_{y4}=F_{y1}+\Delta F_{y4}$)}, wherein each fundamental color is varied at least once, and at least one other fundamental color is varied in each said additional combination measuring field;

printing at least one single-color full-tone field for each fundamental color on each of said primary prints;

printing at least one single-color half-tone field for each fundamental color on each of said primary prints, wherein said single-color half-tone fields have, in their corresponding fundamental color, a degree of surface coverage ($F_{c1}$, $F_{m1}$, $F_{y1}$) that corresponds to that of the same color in the first combination measuring field, and/or said single-color half-tone fields have, in their corresponding fundamental color, a degree of surface coverage ($F_{c2}$, $F_{m3}$, $F_{y4}$) that corresponds to the varied degree of surface coverage of the same color in said additional combination measuring field;

determining on said primary prints color location vectors $\underline{R}_1$, $\underline{R}_2$, $\underline{R}_3$, and $\underline{R}_4$ in said combination measuring fields in a selected colorimetric system of coordinates(X, Y, Z) by measurement with a colorimeter;

determining on said primary prints full-tone density values ($D_{Vc1}$, $D_{Vm1}$, $D_{Vy1}$, $D_{Vc2}$, $D_{Vm3}$, $D_{Vy4}$) in the individual color full-tone fields by densitometric measurement with a filter characteristic corresponding to the individual field;

determining effective degrees of surface coverage $F_{ec1}$, $F_{ec2}$, $F_{em1}$, $F_{em3}$, $F_{ey1}$, $F_{ey4}$, in said individual color half-tone fields of said first primary print by densitometric or other measurements;

determining two transformation functions A and B using the color location vectors ($\underline{R}_1$, $\underline{R}_2$, $\underline{R}_3$, and $\underline{R}_4$), the full-tone densities ($D_{Vc1}$, $D_{Vm1}$, $D_{Vy1}$, $D_{Vc2}$, $D_{Vm3}$, $D_{Vy4}$), and the effective degrees of surface coverage ($F_{ec1}$, $F_{ec2}$, $F_{em1}$, $F_{em3}$, $F_{cy1}$, $F_{cy4}$) of said primary prints, said two transformation functions A and B, providing a conversion of a variation $\underline{\Delta D}_V$ in the full-tone density in the individual color full-tone fields, which variation is caused by a change in the ink layer thicknesses, and a variation $\Delta F_e$ in the degree of surface coverage in the individual color half-tone fields with the degree of surface coverage $F_{c1}$, $F_{m1}$, and $F_{y1}$, which variation in surface coverage is independent from the variation in density, into variations ($\underline{\Delta R}_{Dv1}$, $\underline{\Delta R}_{Fe}$) of the color location vector $\underline{R}_1$ of said first combination measuring field with the nominal degrees of surface coverage $F_{c1}$, $F_{m1}$, and $F_{g1}$;

repeatedly determining the color location vector $R_{11}$ in the selected system of coordinates ($X_1$ Y, Z) on the printed product to be checked by measurement with a colorimeter on said first combination measuring field;

calculating a variation $$\underline{\underline{\Delta E}}_{11} = \begin{bmatrix} \Delta F_{ec11} \\ \Delta F_{em11} \\ \Delta F_{ey11} \end{bmatrix}$$

in the effective degrees of surface coverage in the existing or imaginary individual color half-tone fields with the degrees of surface coverage $F_{c1}$, $F_{m1}$, $F_{y1}$, which variation is independent from changes in the ink layer thickness, for the deviation $\underline{\Delta R}_{11}=\underline{R}_{11}-\underline{R}_0$ of the color location vector $\underline{R}_{11}$ determined on said printed product which is to be checked, which deviation is related to a predetermined desired color location vector $\underline{R}_0$; and correcting the deviation $\underline{\Delta R}_{11}$ of the color location vector on the printed product such that the calculated variation $\underline{\Delta F}_{11}$ of the effective degrees of surface coverage is caused to disappear by making a change in the degrees of surface coverage at the time of the preparation of the color extracts, which said change is independent from variations of the ink layer thickness.

2. A process for color management in the rotary offset printing of single editions, comprising the steps of:

a) jointly printing measured fields and/or image areas used as measured fields;

b) optically scanning the measured fields after said step of printing;

c) evaluating light remitted during said step of scanning; and d) preparing a printed product to be checked and a plurality of primary prints with intentionally different ink layer thicknesses with a first combination measured field each, in which the fundamental colors cyan, magenta and yellow are superprinted at a degree of surface coverage $F_{c1}$, $F_{m1}$, $F_{y1}$, e) providing the primary prints with additional combination measured fields, in which the fundamental colors are superprinted at varied degrees of surface coverage ($F_{c2}=F_{c1}+\Delta F_{c2}$, $F_{m1}$, $F_{y1}$), ($F_{c1}$, $F_{m3}=F_{m1}+\Delta F_{m3}$, $F_{y1}$), ($F_{c1}$, $F_{m1}$, $F_{y4}=F_{y1}+\Delta F_{y4}$), wherein each fundamental color is varied at least once, and at least one other fundamental color is varied in each additional combination measured field;

f) providing the primary prints additionally with at least one single-color full-tone field per fundamental color; and g) providing the primary prints additionally with at least one single-color half-tone field per fundamental color, wherein said single-color half-tone fields have, in their corresponding fundamental color, a degree of surface coverage ($F_{e1}$, $F_{m1}$, $F_{y1}$) that corresponds to that of the same color in the first combination measured field, and/or said single-color half-tone fields have, in their corresponding fundamental color, a degree of surface coverage ($F_{c2}$, $F_{m3}$, $F_{y4}$) that corresponds to the varied degree of surface coverage of the same color in the additional combination measured fields.

3. A process in accordance with claim 2, further comprising the steps of, on the primary prints:

a) determining corresponding color location vectors $\underline{R}1$ of said first combination measured field and $\underline{R}_2$, $\underline{R}_3$ and $\underline{R}_4$ of said additional combination measured fields in a selected colorimetric system of coordinates by measurement with a calorimeter on the combination measured fields;

b) determining full-tone density values $D_{Vc1}$, $D_{Vm1}$, $D_{Vy1}$ in the single-color full-tone fields by densitometric measurement with a filter characteristic corresponding to the individual field, and c) determining effective degrees of surface coverage in the print, $F_{ec1}$, $F_{ec2}$, $F_{em1}$, $F_{em3}$, $F_{ey1}$, $F_{ey4}$ in said single-color half-tone fields by densitometric measurements.

4. A process in accordance with claim 3, wherein the color location vectors ($\underline{R}_1$, $\underline{R}_2$, $\underline{R}_3$, $\underline{R}_4$), the full-tone densities ($D_{Vc1}$, $D_{Vm1}$, $D_{Vy1}$), and the effective degrees of surface coverage ($F_{ec1}$, $F_{ec2}$, $F_{em1}$, $F_{em3}$, $F_{ey1}$, $F_{ey4}$) of the primary prints are used to determine two transformation functions A and B, which convert a variation $$\underline{\Delta D}_{v1} = \begin{bmatrix} \Delta D_{vc1} \\ \Delta D_{vm1} \\ \Delta D_{vy1} \end{bmatrix}$$

in the full-tone density in the single-color full-tone fields, which variation is due to a change in the ink layer thicknesses, or a variation $$\underline{\Delta F}_{e1} = \begin{bmatrix} \Delta F_{ec1} \\ \Delta F_{em1} \\ \Delta F_{ey1} \end{bmatrix}$$

in the effective degrees of surface coverage in the single-color half-tone fields with the nominal degrees of surface coverage $F_{c1}$, $F_{m1}$ and $F_{y1}$, which variation is independent from the full-tone density in the single-color full-tone fields variation, into variations of the color location vector $\underline{\Delta R}$ of the first combination measured field with the nominal degrees of surface coverage ($F_{c1}$, $F_{m1}$, $F_{y1}$).

5. A process in accordance with claim 4, further comprising the steps of:

a) repeatedly determining the color location vector of said first combination measured field of a first of said plurality of primary prints $\underline{R}_{11}$ is in the selected system of coordinates on the printed product by measurement with a colorimeter on the first combination measured field; and b) calculating a combination of a variation $$\underline{\Delta D}_{v11} = \begin{bmatrix} \Delta D_{vc11} \\ \Delta D_{vm11} \\ \Delta D_{vy11} \end{bmatrix}$$

in the full-tone density in existing or imaginary single-color full-tone fields, which is due to a change in the ink layer thickness, and a variation $$\underline{\Delta F}_{y11} = \begin{bmatrix} \Delta F_{ec11} \\ \Delta F_{em11} \\ \Delta F_{ey11} \end{bmatrix}$$

in the effective degrees of surface coverage in single-color half-tone fields at the nominal degrees of surface coverage $F_{c1}$, $F_{m1}$, $F_{y1}$, which variation is independent from the variation in the full-tone density in existing or imaginary single-color full-tone fields, for the deviation of the color location vector $\underline{\Delta R}_{11}=\underline{R}_{11}-\underline{R}_0$ determined on the printed product, which deviation is related to a predetermined desired color location vector $\underline{R}_0$.

6. A process in accordance with claim 5, wherein the variation $\underline{\Delta R}$hd 11exactly corresponds to the combined effect of the variations $\underline{\Delta R}_{V11}$ and $\underline{\Delta F}_{e11}$ via the transformation functions A and B.

7. A process in accordance with claim 5, wherein:

the deviation of the color location vector $\underline{\Delta R11}$ on the printed product is corrected in the sense that the calculated variation $\underline{\Delta Dv11}$ of the full-tone densities is caused to disappear by adjusting the color-guiding final control elements on the printing press, and the calculated variation $\underline{\Delta Fe11}$ in the effective degrees of surface coverage is caused to disappear by changing the degrees of surface coverage during the preparation of the color separations.

8. A process in accordance with claim 4, wherein: the transformation functions A and B are linear, i.e., they are characterized by two 3×3 matrices $\underline{\underline{A}}$ and $\underline{\underline{B}}$, and that the equation $$\underline{\Delta R}_1=\underline{\underline{A}}\,\underline{\Delta D}_{V1}+\underline{\underline{B}}\,\underline{\Delta F}_{e1} \text{ or } \underline{\Delta R}_{11}=\underline{\underline{A}}\,\underline{\Delta D}_{V11}+\underline{\underline{B}}\,\underline{\Delta F}_{e11} \text{ is valid.}$$

9. A process in accordance with claim 8, wherein:

a combination of a variation $\underline{\Delta D}_{11}$ in the full-tone densities, which is due to a change in the ink layer thicknesses, and a variation $\underline{\Delta F}_{e11}$ in the degrees of surface coverage, which variation is independent from the variation in the full-tone densities, which is due to a change in the ink layer thicknesses, is calculated for a deviation $\underline{\Delta R}_{11}$ of the color location vector determined on the printed product such that $\underline{\Delta R}_{11}=\underline{\underline{A}}\,\underline{\Delta D}_{V11}+\underline{\underline{B}}\,\underline{\Delta F}_{e11}$ is at the same time valid, wherein $\underline{\underline{A}}\,\underline{\Delta D}_{V11}$ corresponds to the accidental component of $\underline{\Delta R}_{11}$ and $\underline{\underline{B}}\,\underline{\Delta F}_{e11}$ represents the systematic component of $\underline{\Delta R}_{11}$, i.e., the component that is constant over a plurality of consecutive print jobs.

10. A process in accordance with claim 4 wherein:

a variation $\underline{\Delta D}_{V11}$ in the full-tone densities, which is due to a change in the ink layer thicknesses, is calculated for a deviation $\underline{\Delta R}_{11}$ of the color location vector determined on the printed product, wherein the variation $\underline{\Delta R}_{11}$ exactly corresponds to the effect of the variation $\underline{\Delta D}_{V11}$ via the transformation function A, and that the deviation of the color location vector $\underline{\Delta R}_{V11}$ on the printed product is corrected in the sense that the calculated variation $\underline{\Delta D}_{V11}$ in the full-tone densities is caused to disappear by adjusting the color-guiding final control elements on the printing press.

11. A process in accordance with one of the claim 4 wherein:

a variation $\underline{\Delta F}_{e11}$ in the effective degrees of surface coverage in the existing or imaginary single-color half-tone fields at the nominal degrees of surface coverage $F_{c1}$, $F_{m1}$, and $F_{y1}$, which variation is independent from changes in the ink layer thicknesses, is calculated for a deviation $\underline{\Delta R}_{11}$ of the color location vector determined on the printed product, wherein the variation $\underline{\Delta R}_{11}$ exactly corresponds to the effect of the variation $\underline{\Delta F}_{c11}$ via the transformation function B alone, and that the deviation of the color location vector $\underline{\Delta R}_{11}$ on the printed product is corrected in the sense that the calculated variation $\underline{\Delta F}_{e11}$ in the effective degrees of surface coverage is compensated as a consequence of a change in the degrees of surface coverage during the preparation of the color separations, which deviation is independent from variations in the ink layer thickness.

12. A process in accordance with claim 2 wherein the combination measured field on the printed product is an image area.

13. A process in accordance with claim 2 wherein:

the combination measured fields on the primary prints and on the printed product are printed with a half-tone in black in addition to cyan, magenta and yellow, and the nominal degree of surface coverage of black is the same in all combination measured fields.

14. A process in accordance with claim 2 wherein a colorimetric and/or densitometric measurement is performed with a spectrophotometer.

15. A process in accordance with claim 2 wherein a densitometric measurement is performed with a densitometer.

16. A process in accordance with claim 2 wherein colorimetric measurement is performed with a three-range colorimeter.

* * * * *